(12) United States Patent
Shiraishi et al.

(10) Patent No.: US 9,885,913 B2
(45) Date of Patent: Feb. 6, 2018

(54) LIQUID CRYSTAL DISPLAY DEVICE

(71) Applicant: Japan Display Inc., Tokyo (JP)

(72) Inventors: Yasuhisa Shiraishi, Tokyo (JP);
Tomohisa Onishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 109 days.

(21) Appl. No.: 14/920,632

(22) Filed: Oct. 22, 2015

(65) Prior Publication Data
US 2016/0116667 A1   Apr. 28, 2016

(30) Foreign Application Priority Data
Oct. 24, 2014 (JP) .................... 2014-217462

(51) Int. Cl.
*G02F 1/1335* (2006.01)
*F21V 8/00* (2006.01)

(52) U.S. Cl.
CPC ..... *G02F 1/133615* (2013.01); *G02B 6/0016* (2013.01); *G02B 6/0068* (2013.01); *G02B 6/0073* (2013.01); *G02F 1/133606* (2013.01); *G02B 6/0038* (2013.01)

(58) Field of Classification Search
CPC ......... G02F 1/133615; G02F 1/133606; G02B 6/0068; G02B 6/0073
See application file for complete search history.

(56) References Cited

U.S. PATENT DOCUMENTS

| 8,449,163 B2 * | 5/2013 | Yang | G02B 6/0023 362/607 |
|---|---|---|---|
| 2010/0172155 A1 * | 7/2010 | Kim | G02B 6/0016 362/621 |
| 2012/0050149 A1 * | 3/2012 | Ro | G02B 6/0016 345/102 |
| 2013/0033893 A1 * | 2/2013 | Ando | G02B 6/002 362/602 |
| 2013/0070477 A1 | 3/2013 | Yamada et al. | |
| 2013/0208502 A1 * | 8/2013 | Nakayama | G02B 6/0018 362/608 |

FOREIGN PATENT DOCUMENTS

| JP | 2013-069498 A | 4/2013 |
|---|---|---|
| JP | 2013-93199 A | 5/2013 |

* cited by examiner

*Primary Examiner* — Dung Nguyen
(74) *Attorney, Agent, or Firm* — Typha IP LLC

(57) ABSTRACT

This invention reduces or prevents a phenomenon where a screen close to a light source becomes yellowed. A liquid crystal display device includes a liquid crystal display panel and a backlight. The backlight includes a light guide plate 10 and white LEDs 21 arrayed in a first direction on a plane of incidence 11 of the light guide plate 10. The white LEDs 21 each includes, in the first direction on a light-emitting surface, a central area occupied by a blue spectrum more densely than at adjacent sides of the central area. Incident plane protrusions 111, each extending in a thickness direction of the light guide plate 10, are formed on a section corresponding to the area having the dense blue spectrum of each LED 21, at the plane of incidence 11 of the light guide plate 10.

17 Claims, 15 Drawing Sheets

LIQUID CRYSTAL DISPLAY DEVICE

CLAIM OF PRIORITY

The present application claims priority from Japanese Patent Application JP 2014-217462 filed on Oct. 24, 2014, the content of which is hereby incorporated by reference into this application.

BACKGROUND OF THE INVENTION

1. Field of the Invention

The present invention relates to liquid crystal display devices that each includes a backlight using light-emitting diodes (LEDs) as a light source, the liquid crystal display devices incorporating a preventive measure against color unevenness in the vicinity of the light source.

2. Description of the Related Art

Liquid crystal display devices include a thin-film transistor (TFT) substrate formed by elements such as pixel electrodes and TFTs, a counter substrate facing the TFT substrate, and liquid crystals sandwiched between the TFT substrate and the counter substrate. The transmittance of the light passing through the liquid crystal molecules is controlled on a pixel-by-pixel basis to form an image.

Since the liquid crystals themselves do not emit light, a backlight is disposed on a rear side of a liquid crystal display panel. Each of the liquid crystal display devices such as cellular phones uses LEDs as a light source for the backlight. The LEDs are arranged on a side surface of a light guide plate, various optical sheets are also arranged on the light guide plate, and these optical parts are accommodated in a molding, thereby to configure the backlight. The method of arranging the LEDs on the side surface of the light guide plate is called the side light method.

The LEDs constitute a point light source, and the uniformity of luminance in the backlight therefore is a vital factor. JP-A-2013-69498 describes a configuration intended to obtain uniform luminance of a backlight by forming linear prismatic grooves on a lower surface of a light guide plate. JP-A-2013-93199 describes configurations of two kinds of grooved structures. One of the grooves structures is disposed on at least one of a light-emitting surface and a counter surface of a light guide plate. The other one having anisotropic diffusion characteristics is on the light-receiving surface. These grooved structures enable uniform luminance of light from a backlight.

SUMMARY OF THE INVENTION

The configurations described in JP-A-2013-69498 and JP-A-2013-93199 both intend to improve the uniformity of luminance in the respective backlights that use white LEDs. White LEDs are commonly used to obtain white light by placing a yellow fluorescent substance around an LED chip configured to emit high-energy light. In each backlight using these LEDs, when a white color is displayed, an area in which the white color has shifted to yellow tends to occur in an area relatively close to the light source. The present invention is intended to prevent this problem, that is, yellowing, from occurring.

Solution to Problem

An object of the present invention is to overcome the above problem, specifically by the following methods.

(1) A liquid crystal display device including a liquid crystal display panel and a backlight. The backlight includes a light guide plate and white LEDs arrayed in a first direction on a plane of incidence of the light guide plate. The white LEDs each includes, in the first direction on a light-emitting surface, a central area occupied by a blue spectrum more densely than at its both sides. Incident plane protrusions, each extending in a thickness direction of the light guide plate, are formed on a section corresponding to the area having the dense blue spectrum of the LEDs at the plane of incidence of the light guide plate.

(2) The liquid crystal display device described in above item (1), wherein an amount of light, refracted on the section corresponding to the area having the dense blue spectrum of the LEDs at the plane of incidence of the light guide plate, is larger than an amount of light refracted in any other areas of the light guide plate.

(3) The liquid crystal display device described in above item (1), wherein the area having the dense blue spectrum has a maximum "u'" value of 0.4 on a CIE chromaticity diagram'

(4) A liquid crystal display device including a liquid crystal display panel and a backlight, the backlight including a light guide plate and white LEDs arrayed in a first direction on a plane of incidence of the light guide plate. The white LEDs each includes on a light-emitting surface: a first area occupied by a blue spectrum more densely than at adjacent sides of the first area in the center of the first direction on the light-emitting surface; and a second area occupied by a yellow spectrum more densely than at adjacent sides of the second area in the first direction on the light-emitting surface than in the first area. First incident plane protrusions, each extending in a thickness direction of the light guide plate, are formed on a section corresponding to the first area of each LED, at the plane of incidence of the light guide plate; and second incident plane protrusions, each extending in the thickness direction of the light guide plate, are formed on a section corresponding to the second area of the LED at the plane of incidence of the light guide plate. The first incident plane protrusions are formed at pitches shorter than those of the second incident plane protrusions.

(5) The liquid crystal display device described in above item (4), wherein the height of the first incident plane protrusions is greater than that of the second incident plane protrusions.

(6) A liquid crystal display device including a liquid crystal display panel and a backlight, the backlight including a light guide plate and white LEDs arrayed in a first direction on a plane of incidence of the light guide plate. The white LEDs each includes on a light-emitting surface: a first area occupied by a blue spectrum more densely than at adjacent sides of the first area in the center of the first direction on the light-emitting surface; and a second area occupied by a yellow spectrum more densely than at adjacent sides of the second area in the first direction on the light-emitting surface than in the first area. First incident plane protrusions, each extending in a thickness direction of the light guide plate, are formed on a section corresponding to the first area of each LED at the plane of incidence of the light guide plate; and second incident plane protrusions, each extending in the thickness direction of the light guide plate, are formed on a section corresponding to the second area of the LED at the plane of incidence of the light guide plate. The height of the first incident plane protrusions is greater than that of the second incident plane protrusions.

(7) The liquid crystal display device described in above item (6), wherein a pitch of the first incident plane protrusions is the same as that of the second incident plane protrusions.

(8) The liquid crystal display device described in any one of items (4) to (7), wherein the area having the dense blue spectrum has a maximum "u'" value of 0.4 on a CIE chromaticity diagram.

(9) The liquid crystal display device described in any one of items (1) to (8), wherein the incident plane protrusions are arc-shaped in cross-sectional profile on a surface parallel to a principal plane of the light guide plate.

(10) The liquid crystal display device described in any one of items (1) to (8), wherein the incident plane protrusions are triangular in cross-sectional profile on a surface parallel to a principal plane of the light guide plate.

DESCRIPTION OF EMBODIMENTS

The present invention will be described in detail below with reference to embodiments thereof.

First Embodiment

Figure 1:
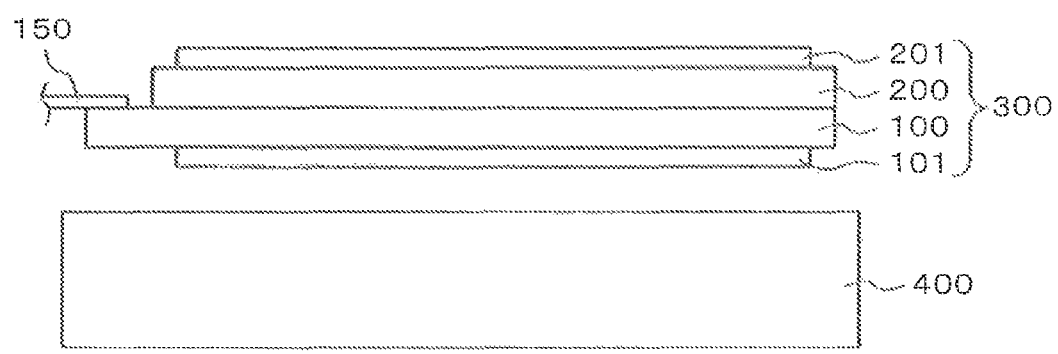
FIG. 1 is a schematic cross-sectional view of a liquid crystal display device.

FIG. 1 is a schematic cross-sectional view of a liquid crystal display device. The liquid crystal display device includes a liquid crystal display panel 300 and a backlight 400. The liquid crystal display panel 300 includes: a TFT substrate 100 on which pixels, having TFTs and pixel electrodes, are formed in a matrix format; a counter substrate 200 which is positioned opposite to the TFT substrate 100; liquid crystals which are sandwiched between the TFT substrate 100 and the counter substrate 200; a lower polarizer 101 which is attached to the TFT substrate 100; and an upper polarizer 201 which is attached to the counter substrate 200. The backlight 400 is disposed on a rear side of the liquid crystal display panel 300.

Figure 2:
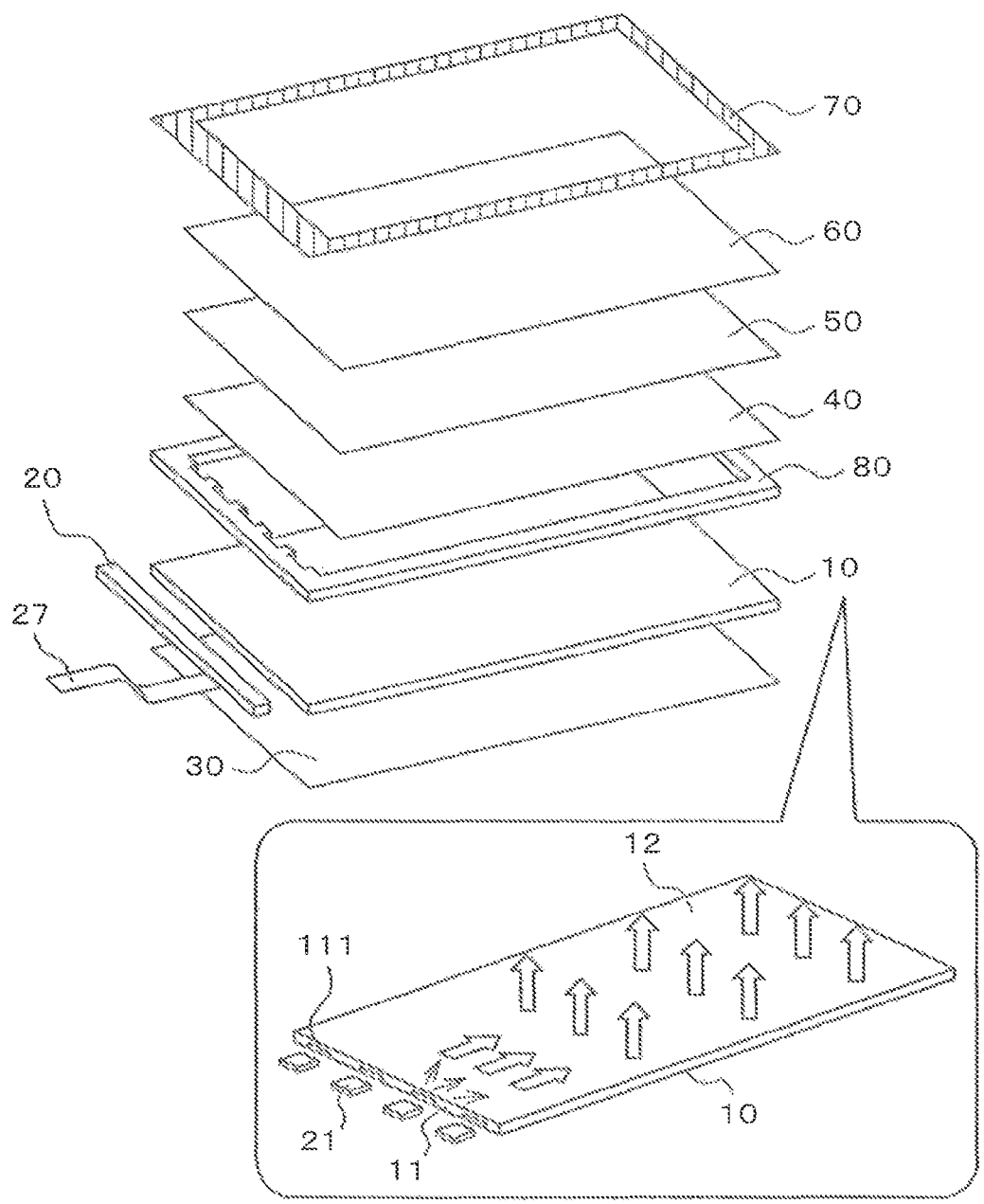
FIG. 2 is a perspective view of a backlight.

FIG. 2 is a perspective view showing a configuration of the backlight 400. Referring to FIG. 2, a light source 20 with LEDs is disposed on a side surface of a light guide plate 10. A flexible wiring substrate 27 for light sources is connected to the light source 20. A reflecting sheet 30 for directing light toward the liquid crystal display panel is placed on a lower surface of the light guide plate 10. A diffusing sheet 40 for diffusing the light uniformly is placed on the light guide plate 10. A lower prismatic sheet 50, with a large number of linear prismatic structures formed in a specific direction on the sheet, is disposed on the diffusing sheet 40. And an upper prismatic sheet 60, with a large number of linear prismatic structures formed in a direction perpendicular to the specific direction on the sheet 60, is disposed on the lower prismatic sheet 50. The lower prismatic sheet 50 and the upper prismatic sheet 60 perform the function of directing in a direction normal to the liquid crystal display panel 300 the light incident in an oblique direction relative to the liquid crystal display panel 300, thereby raising the efficiency in the use of the light coming in from the backlight. A light-blocking sheet 70 for blocking out the light that may propagate to the periphery of the screen of the liquid crystal display panel is formed in a shape of a frame on the upper prismatic sheet 60. The optical parts described above are accommodated in a resin molding 80.

Figure 3:
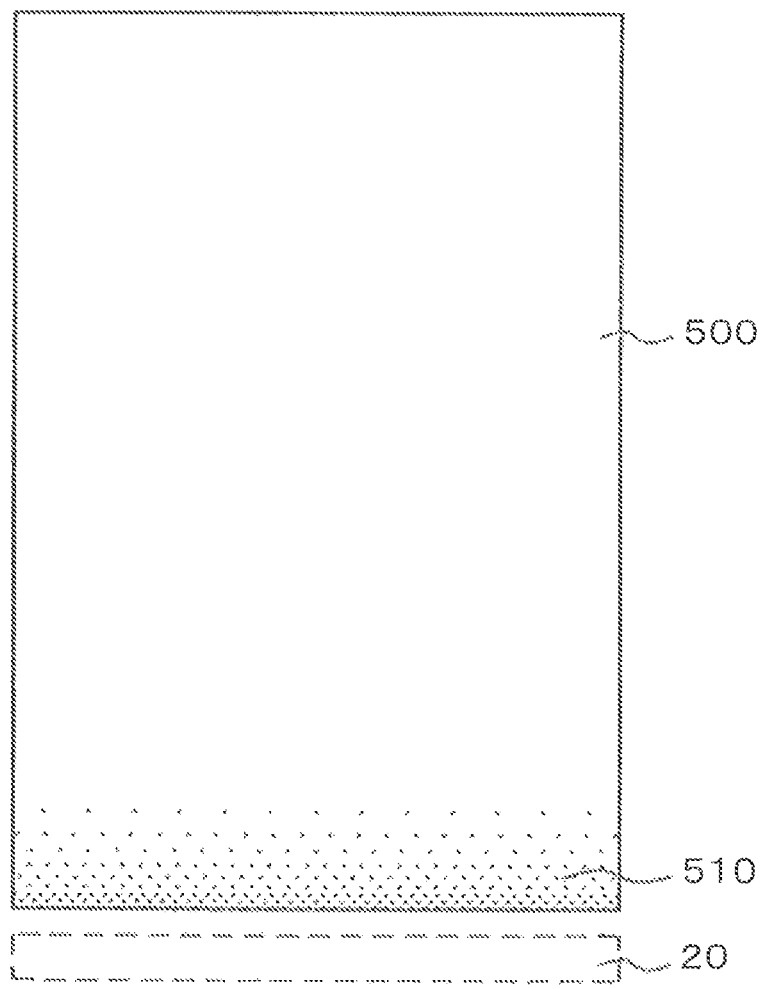
FIG. 3 is a schematic plan view that shows yellowing of a screen.

FIG. 3 is a schematic plan view representing a problem associated with a display screen 500 of a liquid crystal display panel employed in a conventional example. Referring to FIG. 3, a light source 20 with LEDs is disposed near a side surface of the display region on the liquid crystal display panel. During display of a white color on the screen 500, there is a yellowish area on the light source side of the display region. This area is referred to as a yellowing area 510. The following describes the yellowing event.

Figure 4:
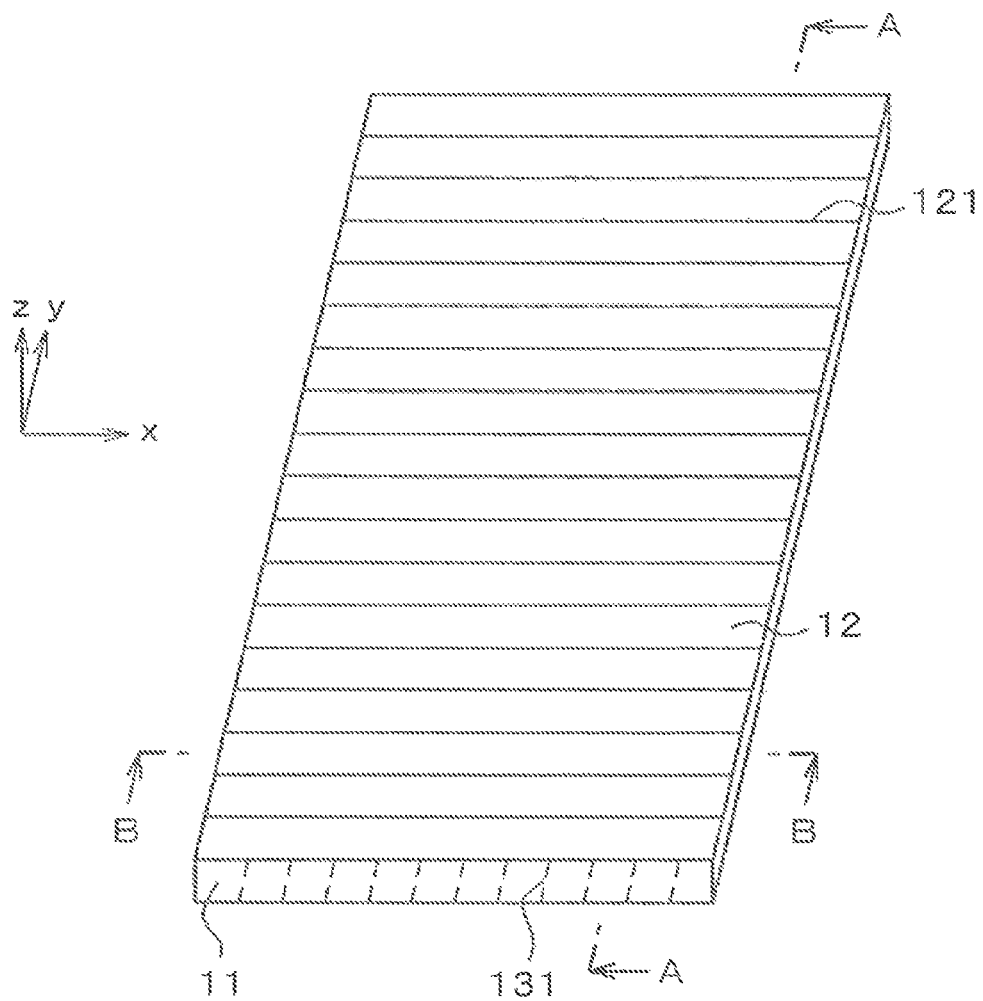
FIG. 4 is a perspective view of a light guide plate.

FIG. 4 is a perspective view of the light guide plate 10. One side 11 of the light guide plate 10 functions as a plane of incidence, and an upper surface of the light guide plate 10 functions as an exit surface 12. On the exit surface 12, such linear protrusions 121 as denoted by reference number 121 in FIG. 4 extend in an x-direction, and these protrusions are arrayed in a y-direction. The lower surface of the light guide plate 10 serves as a plane of reflection, on which such linear protrusions 131 as represented by a dotted line 131 in FIG. 4 extend in the y-direction, and these protrusions are arrayed in the x-direction. The thickness of the light guide plate 10 ranges, for example, from 0.3 to 0.5 mm. The light guide plate 10 is made from a transparent or translucent resin, such as acryl or polycarbonate.

Figure 5:
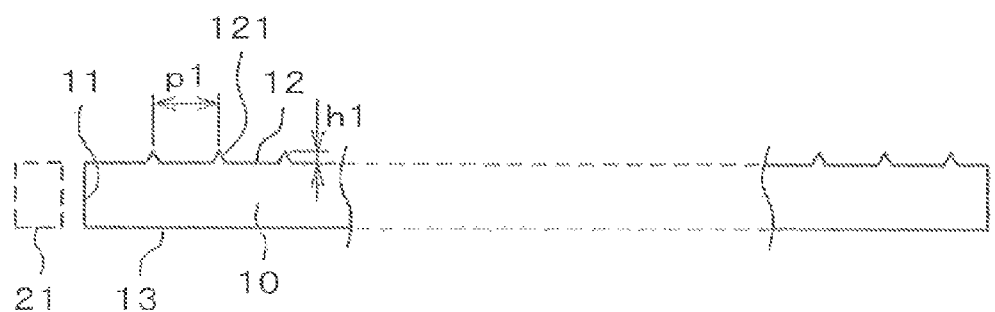
FIG. 5 is a cross-sectional view of section A-A shown in FIG. 4.

FIG. 5 is a cross-sectional view of section A-A shown in FIG. 4. As shown in FIG. 5, the LEDs 21, or the light source, that face the plane of incidence of the light guide plate 10 are disposed as represented by a dotted line. The linear protrusions 121 with height h1 are formed at pitches p1 on the upper surface of the light guide plate 10. The length of each pitch p1 is 100 μm, for example. The height of each linear protrusion 121 is smallest at the portion closest to the LEDs, and increases with longer distance from the LEDs. The height h1 of each linear protrusion 121 is, for example, 0.1 μm at the portion closest to the LEDs, and 10 μm at the portion farthest therefrom. Upper linear protrusions 121 have, for example, substantially the same triangular cross-sectional shape as that of a linear prism.

Figure 6:
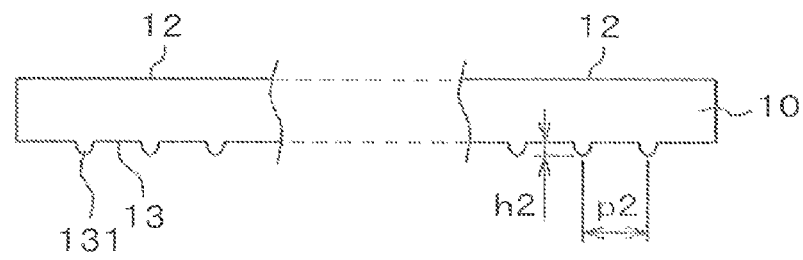
FIG. 6 is a cross-sectional view of section B-B shown in FIG. 4.

FIG. 6 is a cross-sectional view of section B-B shown in FIG. 4. On the lower surface, that is, reflecting surface 13, of the light guide plate 10, lower linear protrusions 131 are formed at pitches p2 and with height h2. The length of each pitch p2 is 100 μm, for example, and the height h2 is constant and is, for example, 10 μm. Unlike the upper linear protrusions 121, the lower linear protrusions 131 are, for example, arc-shaped or barrel-shaped in cross-sectional profile.

Figure 7:
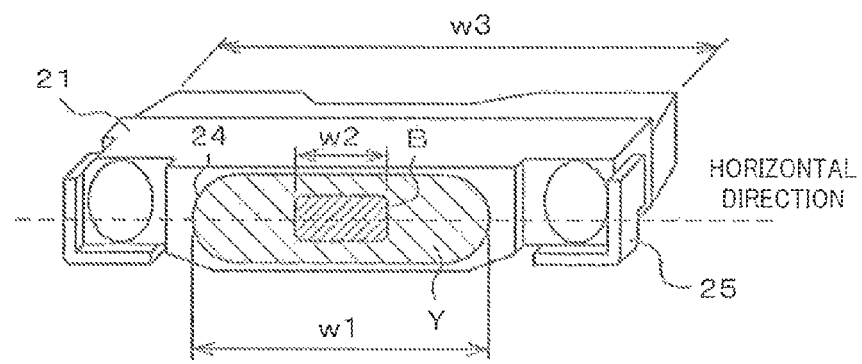
FIG. 7 is a perspective view of an LED.

FIG. 7 is a perspective view showing a shape of one of the LEDs 20. Width w1 of a light-emitting surface on the LED 20 is, for example, 3.0 mm, and package width w3 of the LED 20 is, for example, 3.8 mm. An electrode 25 for supplying an electric current to an LED chip is formed on adjacent sides of the LED 21. FIG. 7 shows a white LED, and this LED is designed to emit white light. When a luminous spectrum developed on the light-emitting surface 24 is measured in detail along a dotted line shown in FIG. 7, however, the spectrum of the LED 21 is mainly occupied by blue at around the central area of the LED, and is mainly occupied by yellow at adjacent sides of the central area. The area shown as B in FIG. 7 denotes the one where blue predominates, and that shown as Y denotes the one where yellow predominates. Width w2 of the area where blue predominates is 1 mm, for example.

Figure 8:
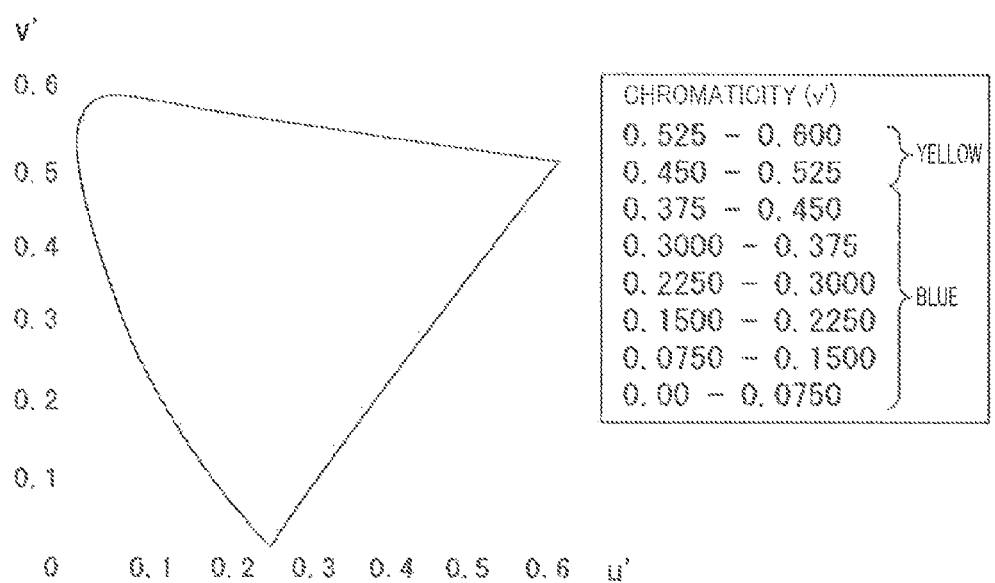
FIG. 8 is a CIE 1976 UCS chromaticity diagram.

FIG. 8 is a CIE 1976 UCS chromaticity diagram. As shown in FIG. 8, a horizontal axis denotes u' and a vertical axis denotes v'. FIG. 8 shows that as v' increases, the light assumes a more yellowish color, and that as v' decreases, the light assumes a more bluish color.

Figure 9:
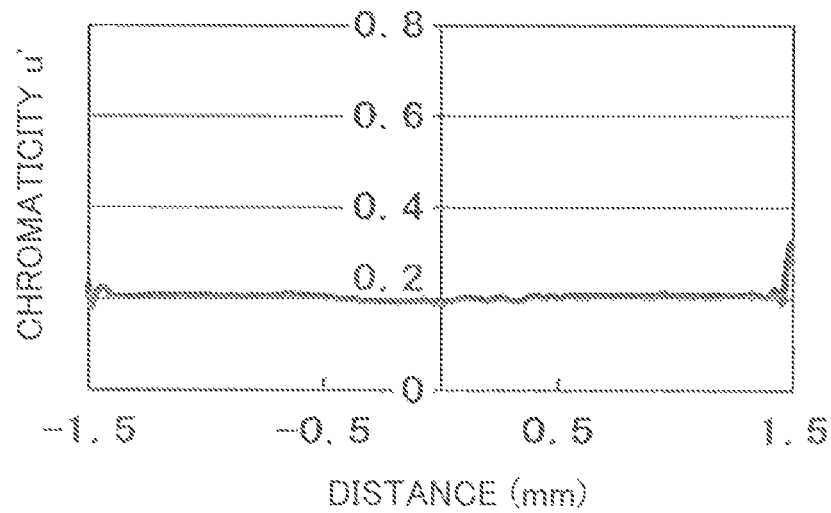
FIG. 9 is a graph that shows changes in u' value on a light-emitting surface of the LED.
Figure 10:
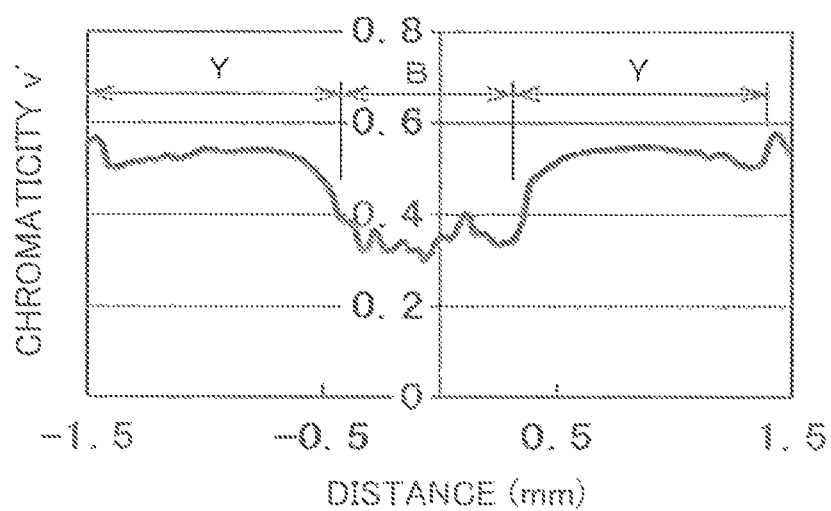
FIG. 10 is a graph that shows changes in v' value on the light-emitting surface of the LED.

FIG. 9 is a representation of changes in the u' value as measured along the dotted line across the light-emitting surface in FIG. 7, and FIG. 10 is a representation of changes in the v' value as measured along the dotted line across on the light-emitting surface in FIG. 7. As shown in FIG. 9, u' undergoes only minimal changes. In contrast to this, v' decreases in its horizontal data range of ±0.5 mm across the center of the light-emitting surface. This area corresponds to an area in which v' is smaller than 0.4. In other words, in this area, blue is relatively predominant, compared to other areas of the light-emitting surface, and yellow is predominant at adjacent sides of the area.

Figure 11:
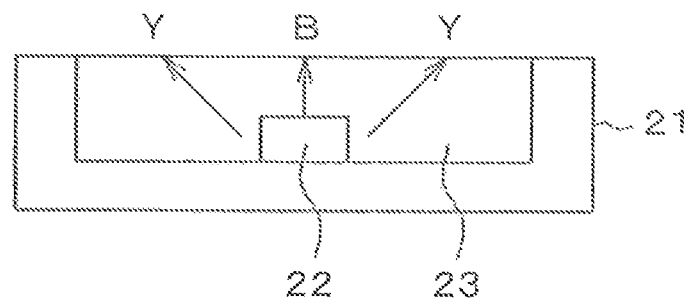
FIG. 11 is a cross-sectional view showing a configuration of the LED.

This color distribution is considered to be due to such a configuration of the LED 21 that is shown in FIG. 11. FIG. 11 is a cross-sectional view of the LED 21, taken along a surface parallel to a principal plane of the light guide plate. The LED package in FIG. 11 contains the LED chip 22 that is surrounded with a yellow fluorescent substance 23. Blue light emissions from the LED chip 22 are subject to color conversion by the fluorescent substance, thus becoming white light as a whole. When the light is microscopically viewed, however, its chromaticity slightly varies from location to location on the light-emitting surface.

Referring to FIG. 11, the light emitted directly to above the LED chip 22, that is, in a direction normal to the light-emitting surface, will assume a slightly bluish color rather than a white color, since the light will only be color-converted at a short distance by the yellow fluorescent substance 23. The light emitted in a direction that forms an angle with the direction normal to the light-emitting surface will assume a slightly yellowish color rather than a white color, since the light will be color-converted at a long distance by yellow fluorescent substance 23.

Figure 12:
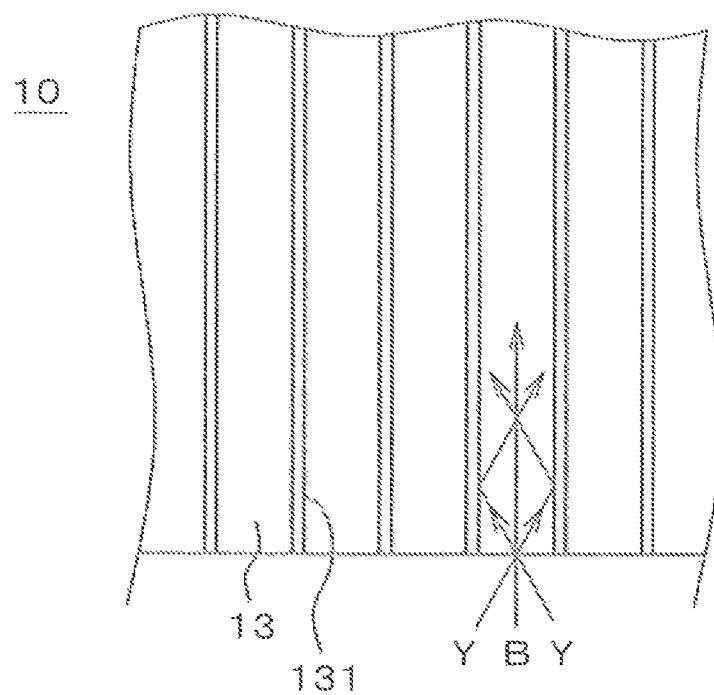
FIG. 12 is a plan view showing a reflecting surface of the light guide plate, the plan view also serving as a schematic diagram to show an optical path of incident light beams.

FIG. 12 is a schematic plan view showing a path that such LED light as shown in FIG. 11 travels after entering the light guide plate 10. Since the bluish light B that has been emitted in the direction normal to the light-emitting surface of the LED enters the plane of incidence of the light guide plate 10 vertically, the bluish light B travels straight ahead and goes a longer distance inside the light guide plate 10. By contrast, the light emitted at a certain angle with respect to the direction normal to the light-emitting surface of the LED is most likely to stay in a greater amount near the light source after being reflected or scattered by the reflecting surface protrusions 131 or the like. In the area close to the light source, therefore, the light emitted from the light guide plate 10 is more yellowish than in other areas. This event is considered to cause yellowish color unevenness on the light source side of the screen in the conventional example.

Figure 13:
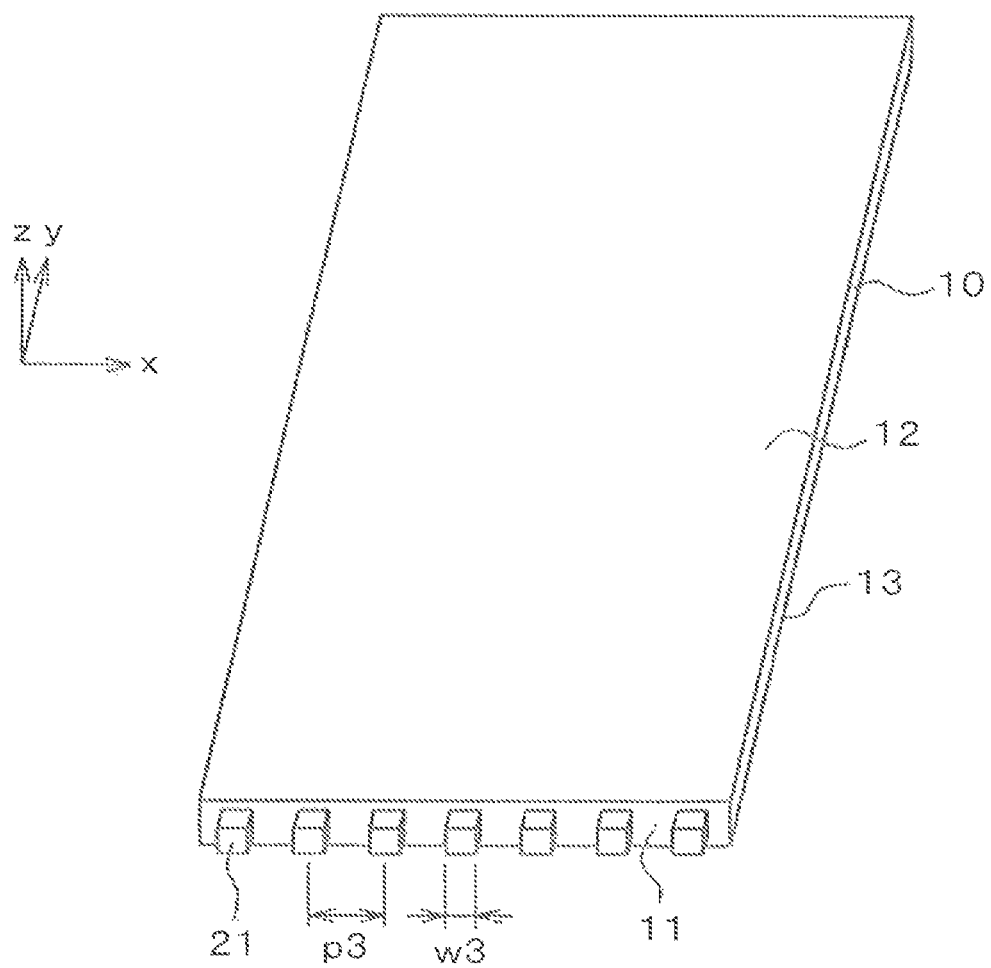
FIG. 13 is a perspective view that shows layout of the light guide plate and the LED.

FIG. 13 is a perspective view that shows exemplary layout of a light guide plate 10 and LEDs 21 serving as a light source. The LEDs 21 in FIG. 13 are arranged at pitches p3 in an x-direction along a plane of incidence 11 on the light guide plate 10. The pitches p3 range, for example, between 5 and 10 mm. Width w3 of the LEDs 21, in the x-direction, corresponds to the width of the LED package shown in FIG. 7. The width w3 is, for example, 3.8 mm. Light that has entered the light guide plate 10 exits from an exit surface 12 and travels toward a liquid crystal display panel disposed above. By contrast, light heading downward from the light guide plate 10 is reflected by a reflecting sheet 30 and then directed toward the exit surface 12.

Figure 14:
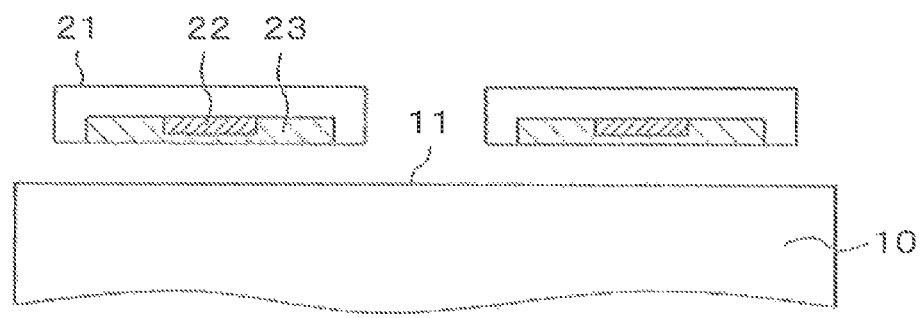
FIG. 14 is a plan view showing a positional relationship between an LED and light guide plate in a conventional example.

FIG. 14 is an enlarged plan view showing a positional relationship between the light guide plate 10 and LED 21 in the conventional example. While an ideal distance between the LED 21 and the light guide plate 10 is zero, there actually is a slight distance due to manufacturing variations in products. The LED configuration is as described in FIG. 11. In the conventional example, as shown in FIG. 12, yellowish light due to the reflection or scattering inside the light guide plate 10 is present in a large amount near the LED, hence causing the yellowing of the screen.

Figure 15A:
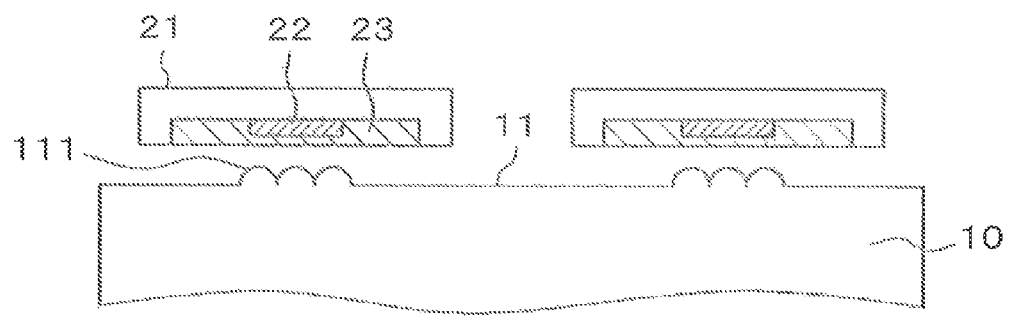
FIG. 15A is a plan view showing a positional relationship between an LED and light guide plate in a first embodiment of the present invention.

FIG. 15A is a plan view showing a positional relationship between an LED 21 and light guide plate 10 in the first embodiment of the present invention. The LED 21 has the same configuration as that described in FIG. 11. LED 21 configurations in a second and subsequent embodiments of the present invention are also the same as the LED 21 configuration of FIG. 11. As shown in FIG. 15A, incident plane protrusions 111 are formed on a plane of incidence of the light guide plate that corresponds to the area where a blue color predominates in the LED 21. These protrusions are disposed to scatter bluish light. The protrusions 111 are provided in association with the area where v' in FIG. 10 is smaller than 0.4. This means that if the LED 21 corresponding to FIG. 10 is used, the area where blue predominates will be formed in a horizontal data range of ±0.5 mm across the central area of the LED 21.

The width of the area where v' in FIG. 10 is smaller than 0.4 may be expressed as w2. Even if the incident plane protrusions 111 are formed in an area narrower than w2, the liquid crystal display device according to the present embodiment will still be effective to a certain degree. In addition, while it has been described as per FIG. 10 that the bluish area is where v' is smaller than or equal to 0.4, the value is not limited to 0.4. If part of the central area is smaller in magnitude of the v' value than on adjacent sides of the central area, the liquid crystal display device according to the present embodiment will still be effective to a certain degree by forming incident plane protrusions 111 on the plane of incidence of the light guide plate 10 so as to make the incident plane protrusions 111 correspond to that part.

Figure 15B:
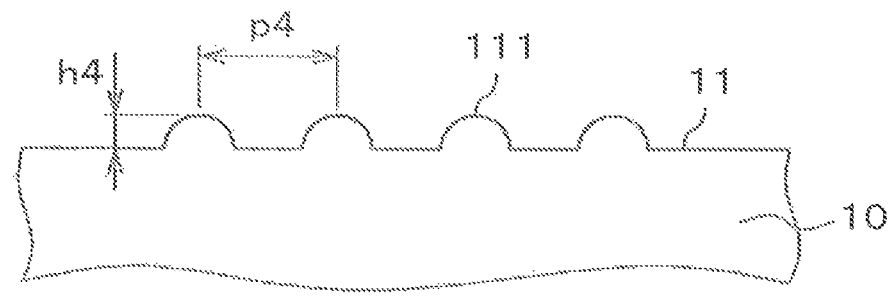
FIG. 15B is an enlarged plan view of FIG. 15A.

FIG. 15B is an enlarged plan view showing a shape of the incident plane protrusions 111 on the plane of incidence of the light guide plate 10 in FIG. 15A. Height h4 of the incident plane protrusions 111 in FIG. 15B is, for example, 5 μm, and pitch p4 of the incident plane protrusions 111 is, for example, 20 μm. The incident plane protrusions 111 are, for example, arc-shaped or barrel-shaped in cross-sectional profile on a surface parallel to a principal plane of the light guide plate. Only four incident plane protrusions are formed in FIG. 15B. However, a larger number of protrusions, nearly 50 pieces for example, are formed in practice.

Figure 15C:
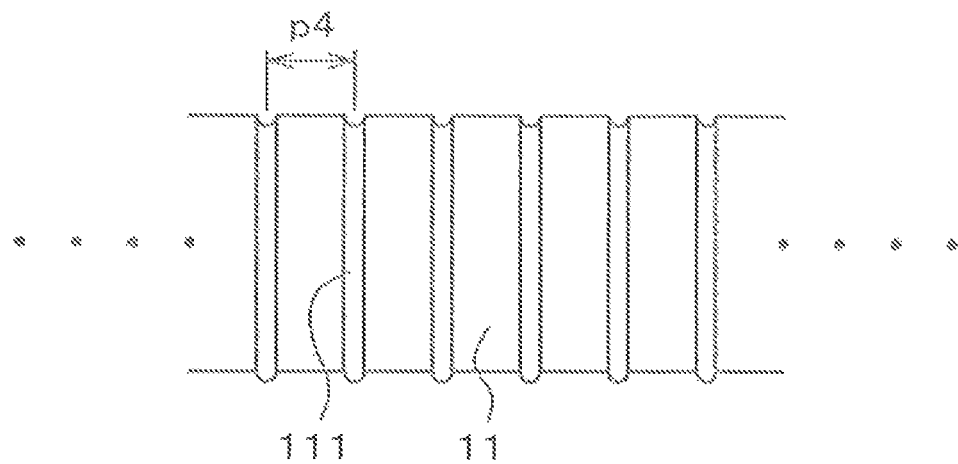
FIG. 15C is a perspective view that shows protrusions present on a plane of incidence.

FIG. 15C is a perspective view of the area in which the incident plane protrusions 111 on the plane of incidence 11 of the light guide plate 10 are formed. The incident plane protrusions 111 are formed linearly at the pitches p4 over the entire thickness direction of the light guide plate 10. While incident plane protrusions 111 in a second and subsequent embodiments of the present invention will only be described in plan view, these incident plane protrusions 111 are formed linearly over the entire thickness direction of a light guide plate 10, as with the protrusions of FIG. 15C.

As set forth above, in accordance with the present embodiment, the occurrence of yellowing near the light source can be mitigated since the incident plane protrusions 11 on the light guide plate 10 refract the bluish light that the LED 21 has emitted primarily from around the central area of the light-emitting surface.

Second Embodiment

Figure 16A:
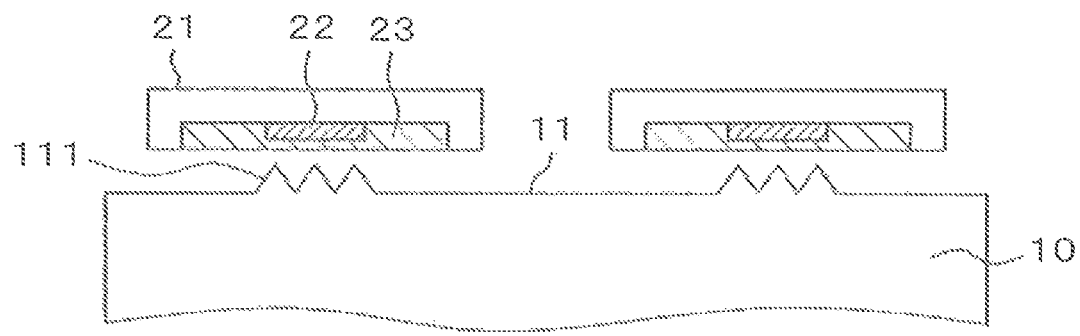
FIG. 16A is a plan view showing a positional relationship between an LED and light guide plate in a second embodiment of the present invention.

FIG. 16A is a plan view showing a positional relationship between an LED 21 and light guide plate 10 in the second embodiment of the present invention. The LED 21 has substantially the same configuration as that described in FIG. 11. As shown in FIG. 16A, incident plane protrusions 111 are formed on the plane of incidence of the light guide plate that corresponds to the area where blue predominates in the LED 21. The present embodiment differs from the first embodiment in that the incident plane protrusions 111 are prismatic or triangular in cross-sectional profile on a surface parallel to a principal plane of the light guide plate. Other configurational aspects are substantially the same as in FIG. 1.

Figure 16B:
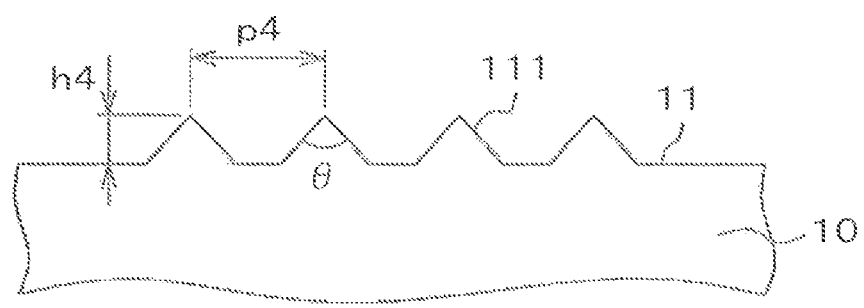
FIG. 16B is an enlarged plan view of FIG. 16A.

FIG. 16B is an enlarged plan view showing a shape of the incident plane protrusions 111 formed on the plane of incidence 11 of the light guide plate 10 in FIG. 16A. Height h4 of the incident plane protrusions 111 in FIG. 16B is, for example, 5 μm, and pitch p4 of the incident plane protrusions 111 is, for example, 20 μm. That is to say, the height h4 and the pitch p4 are the same as in the first embodiment. The incident plane protrusions 111 are typically 90 degrees in apex angle θ. This angle is set to be 90 degrees to obtain incident light refraction characteristics and for a reason of the ease of manufacturing of the incident plane protrusions, but the liquid crystal display device according to the present embodiment still offers the advantageous effects with other angles.

As set forth above, in accordance with the present embodiment, the occurrence of yellowing near the light source can be mitigated since the incident plane protrusions 111 on the light guide plate 10 refract the bluish light that the LED 21 has been emitted primarily from around the central area of the light-emitting surface.

Third Embodiment

Figure 17A:
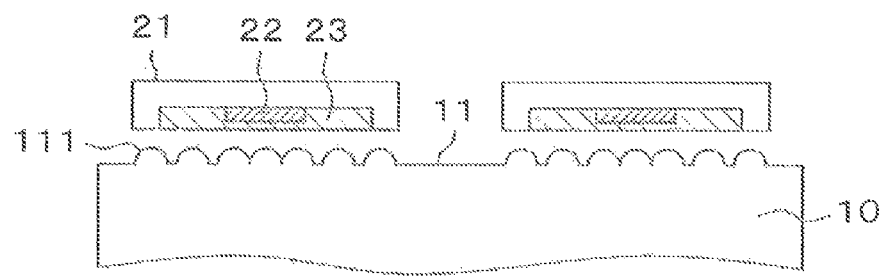
FIG. 17A is a plan view showing a positional relationship between an LED and light guide plate in a third embodiment of the present invention.

FIG. 17A is a plan view showing a positional relationship between an LED 21 and light guide plate 10 in a third embodiment of the present invention. The LED 21 has substantially the same configuration as that described in FIG. 11. As shown in FIG. 17A, on those sections of the plane of incidence 11 of the light guide plate 10 that correspond to the LED area, incident plane protrusions 111 are formed in both the area where a blue color predominates and the area where a yellow color predominates. The incident plane protrusions 111 on the section corresponding to the area where blue predominates, however, are formed at pitches shorter than those of the incident plane protrusions 111 formed on the section corresponding to the area where yellow predominates. Briefly, the density of the incident plane protrusions 111 in the former of the two areas is higher than in the latter. This means that on the section where blue predominates, a greater amount of light is refracted and scattered than on other sections, so that there is a greater amount of blue in an area close to the light source.

Figure 17B:
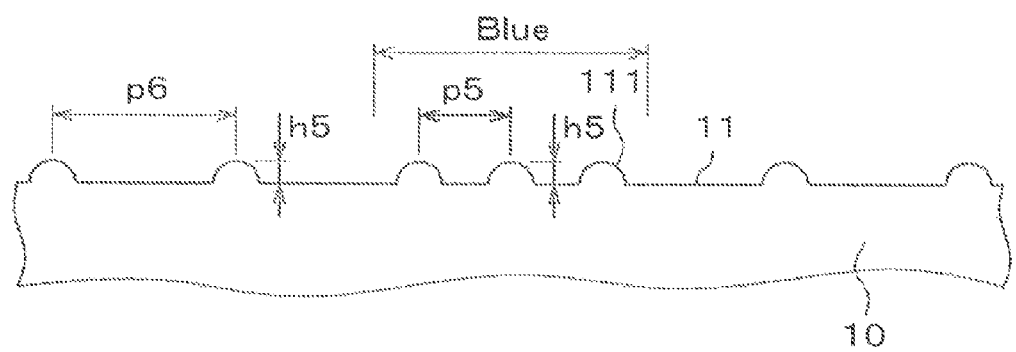
FIG. 17B is an enlarged plan view of FIG. 17A.

FIG. 17B is an enlarged plan view showing a shape of the incident plane protrusions 111 formed on the plane of incidence of the light guide plate 10 in FIG. 17A. As shown in FIG. 17B, the incident plane protrusions 111 on the section of the light guide plate 10 that corresponds to the LED area where blue predominates are formed at pitches p5. The incident plane protrusions 111 on the section of the light guide plate 10 that corresponds to the LED area where yellow predominates are formed at pitches p6. And in this case, p5<p6 holds. In other words, on the section of the light guide plate 10 that corresponds to the LED area where blue predominates, the incident plane protrusions 111 are formed at a density higher than in other areas. The height of the incident plane protrusions 111 is shown as h5, which is the same for both the section where blue predominates and the section where yellow predominates. The values of p5, p6, and h5 are, for example, 20 μm, 40 μm, and 5 μm, respectively.

Referring to FIG. 17B, only three incident plane protrusions 111 are formed in the LED area where blue predominates. However, a larger number of protrusions, nearly 50 pieces for example, are formed in practice. The incident plane protrusions 111 in FIGS. 17A and 17B are arc-shaped in cross-sectional profile, but the protrusions do not always need to have the shape of an arc. Instead, they may have such a prismatic shape that is shown in the second embodiment.

As set forth above, in accordance with the third embodiment, the incident plane protrusions 111 on the section of the light guide plate 10 that corresponds to a specific area of the LED 21 are formed at a density higher than at any other sections. The bluish light emitted from an area close to the central area of the light-emitting surface is thus refracted or scattered in a greater amount, so that the occurrence of yellowing near the light source is mitigated.

Fourth Embodiment

Figure 18A:
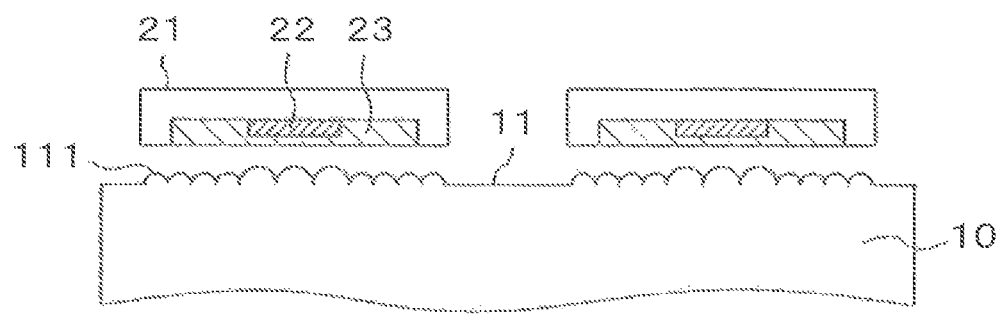
FIG. 18A is a plan view showing a positional relationship between an LED and light guide plate in a fourth embodiment of the present invention.

FIG. 18A is a plan view showing a positional relationship between an LED 21 and light guide plate 10 in a fourth embodiment of the present invention. The LED 21 has substantially the same configuration as that described in FIG. 11. As shown in FIG. 18A, on those sections of the plane of incidence 11 of the light guide plate 10 that correspond to the LED areas, incident plane protrusions 111 are formed in both of the area where a blue color predominates and the area where a yellow color predominates. The height of the incident plane protrusions 111 on the section corresponding to the area where blue predominates in the LED 21, however, is greater than that of the incident plane protrusions 111 formed on the section corresponding to the area where yellow predominates in the LED 21. Such a shape of the protrusions increases the refraction or scattering of the light on the section where blue predominates.

Figure 18B:
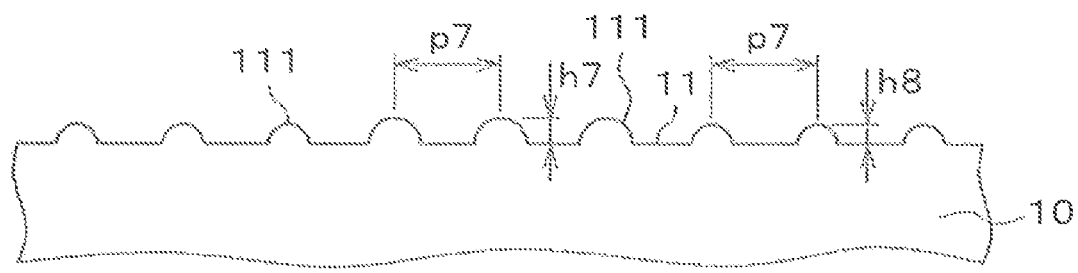
FIG. 18B is an enlarged plan view of FIG. 18A.

FIG. 18B is an enlarged plan view showing a shape of the incident plane protrusions 111 formed on the plane of incidence of the light guide plate 10 in FIG. 18A. As shown in FIG. 18B, the incident plane protrusions 111 on the section of the light guide plate 10 that corresponds to the area where blue predominates in the LED 21 are formed at pitches p7, and the incident plane protrusions 111 on the section of the light guide plate 10 that correspond to the area where yellow predominates in the LED 21 are also formed at the pitches p7. However, height h7 of the incident plane protrusions 111 on the section of the light guide plate 10 that corresponds to the area where blue predominates in the LED 21 is greater than height h8 of the incident plane protrusions 111 formed on the section of the light guide plate 10 that corresponds to the area where yellow predominates in the LED 21. The pitches p7 of the incident plane protrusions 111 are, for example, 20 µm, the height h7 is, for example, 3 µm, and the height h8 is, for example, 1 µm.

Figure 18C:
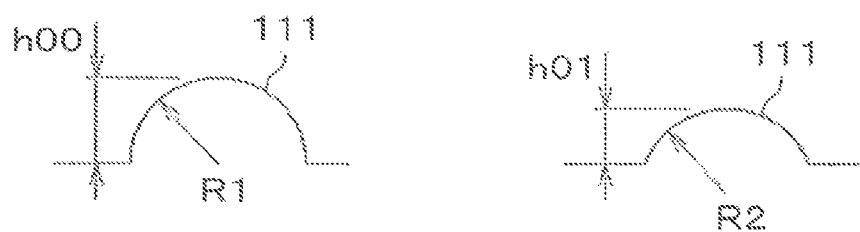
FIG. 18C is a comparative view showing, for comparison, different protrusions present on a plane of incidence.

FIG. 18C is a cross-sectional comparative view of two incident plane protrusions 111 that differ in height. As shown in FIG. 18C, even if the two incident plane protrusions 111 have the same width, the one that is greater in height tends to be smaller in a radius of curvature of the incident plane protrusion, so that this protrusion refracts or scatters incident light in a greater amount.

As set forth above, in accordance with the present embodiment, since the height of the incident plane protrusions 111 formed on the section of the light guide plate 10 that corresponds to a specific area in the LED 21 is greater than the height of other sections, the bluish light emitted from an area close to a central area of the light-emitting surface on the LED 21 will be refracted or scattered in a greater amount, so that the occurrence of yellowing near the light source is mitigated.

Fifth Embodiment

Figure 19:
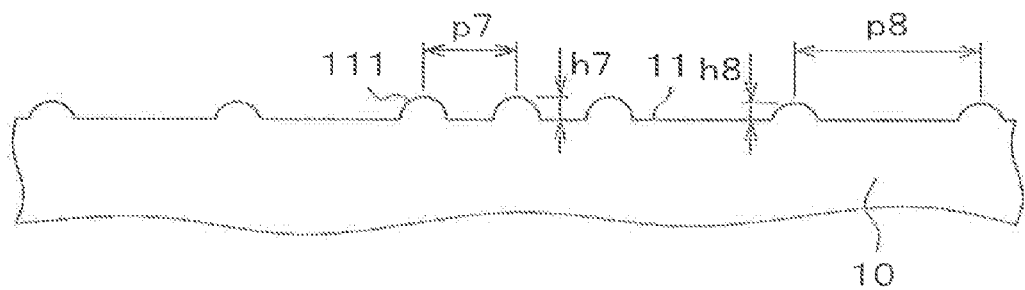
FIG. 19 is an enlarged plan view showing a positional relationship between an LED and light guide plate in a fifth embodiment of the present invention.

FIG. 19 is a plan view showing a section of a light guide plate 10 that corresponds to a light-emitting surface of an LED 21 in a fifth embodiment of the present invention. The present embodiment has a configuration that incorporates features of both the third and fourth embodiments. As shown in FIG. 19, on those sections of the plane of incidence 11 of a light guide plate 10 that correspond to areas of the LED 21, incident plane protrusions 111 are formed in both of the area where a yellow color predominates and the area where a blue color predominates. The incident plane protrusions 111 on the section corresponding to the LED area where blue predominates, however, are greater in height and shorter in pitch than the incident plane protrusions 111 on the section corresponding to the LED area where yellow predominates. Height h7 of the incident plane protrusions 111 on the section corresponding to the LED area where blue predominates is, for example, 3 µm, and pitch p7 is, for example, 20 µm. Height h8 of the incident plane protrusions 111 on the section corresponding to the LED area where yellow predominates is, for example, 1 µm, and pitch p8 is, for example, 40 µm.

As set forth above, in accordance with the present embodiment, the height of the incident plane protrusions 111 formed on the section of the light guide plate 10 that corresponds to a specific area in the LED 21 is greater than that of other sections, and the pitch of these incident plane protrusions is shorter than that of the other sections. Accordingly the bluish light emitted from around the central area of the light-emitting surface on the LED 21 is refracted or scattered in a greater amount, so that the occurrence of yellowing near the light source is mitigated.

Sixth Embodiment

Figure 20A:
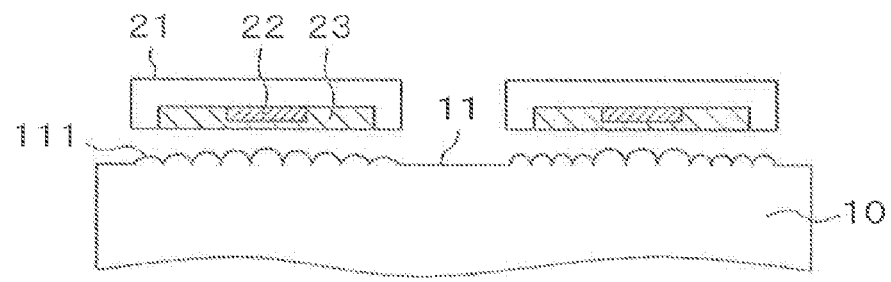
FIG. 20A is a plan view showing a positional relationship between an LED and light guide plate in a sixth embodiment of the present invention.

FIG. 20A is a plan view showing a positional relationship between an LED 21 and light guide plate 10 in a sixth embodiment of the present invention. The LED 21 has substantially the same configuration as that described in FIG. 11. As shown in FIG. 20A, on those sections of the plane of incidence 11 of the light guide plate 10 that correspond to specific areas of the LED 21, incident plane protrusions 111 are formed in both of the area where a blue color predominates and the area where a yellow color predominates. While the height of the incident plane protrusions 111 is greater at the section corresponding to the area where blue predominates in the LED 21, the height of these incident plane protrusions 111 progressively diminishes with decreasing distance with respect to the area where yellow predominates. The pitches of the incident plane protrusions 111 are the same for both the area where blue predominates and the area where yellow predominates.

Figure 20B:
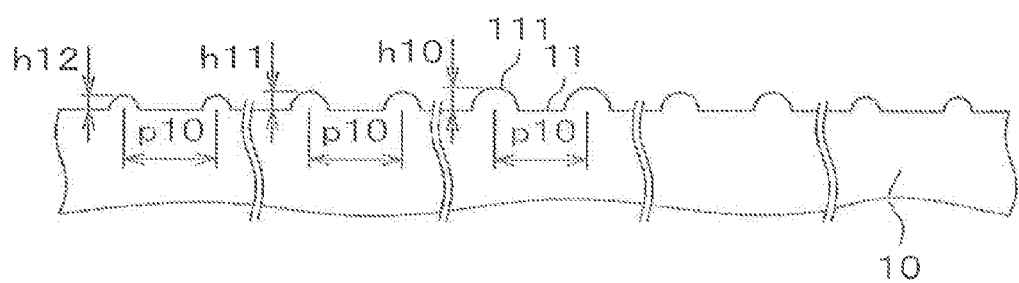
FIG. 20B is an enlarged plan view of FIG. 20A.

FIG. 20B is an enlarged plan view of the light guide plate 10 with the sections corresponding to a light-emitting area of the LED 21, the plan view showing an exemplary layout of the above two sets of incident plane protrusions. As shown in FIG. 20B, the height of the incident plane protrusions 111 in the area where blue predominates is shown as h10, the height of the incident plane protrusions 111 in the area where yellow predominates is shown as h12, and the height of other incident plane protrusions 111 present in between the former two sets of incident plane protrusions 111 is shown as h11. The height h11 is of the incident plane protrusions 111 present at a boundary of the area where blue predominates and the area where yellow predominates. The pitch of the incident plane protrusions 111 in FIG. 20B is constant, which is 20 µm, for example. The height h10 of the incident plane protrusions 111 is 3 µm, the height h11 is 2 µm, and the height h12 is 1 µm, for example.

Referring to FIG. 20A, the height h10 of the incident plane protrusions 111 is constant at the area where blue predominates, and progressively diminishes to a level of h12 at the area where yellow predominates. In the central area where blue predominates, however, the height of the incident plane protrusions may be set as the greatest height h10 of the three heights, and may also progressively diminish to the level of h12 at an outer edge of the area where yellow predominates. In this way, the height of the protrusions may be continuously changed.

As set forth above, in accordance with the present embodiment, the occurrence of yellowing near the light source can be mitigated since at the plane of incidence 11 of the light guide plate 10, bluish light that the LED 21 emits is refracted or scattered in a greater amount than yellowish light.

While the incident plane protrusions in the fourth to sixth embodiments are arc-shaped in cross-sectional profile, the shape of the incident plane protrusions may be triangular or prismatic, as in the second embodiment.

What is claimed is:

1. A liquid crystal display device comprising:
   a liquid crystal display panel; and
   a backlight,
   the backlight including a light guide plate and white LEDs arrayed in a first direction and opposed to a plane of incidence of the light guide plate,
   the white LEDs each including, in the first direction on a light-emitting surface, a central area occupied by a blue spectrum more densely than at its both sides,
   wherein incident plane protrusions, extending in a direction that is perpendicular to a thickness direction of the light guide plate, are formed on a first section corresponding to the area having the dense blue spectrum of the LEDs at the plane of incidence of the light guide plate and a second section corresponding to both sides of the central area, and
   a pitch of incident plane protrusions formed on the first section is shorter than that of incident plane protrusions formed on the second section.

2. The liquid crystal display device according to claim 1, wherein an amount of light, refracted on the section corresponding to the area having the dense blue spectrum of the LEDs at the plane of incidence of the light guide plate, is larger than an amount of light refracted in any other areas of the light guide plate.

3. The liquid crystal display device according to claim 1, wherein the area having the dense blue spectrum has a maximum "u'" value of 0.4 on a CIE chromaticity diagram.

4. The liquid crystal display device according to claim 1, wherein the incident plane protrusions are arc-shaped in cross-sectional profile on a surface parallel to a principal plane of the light guide plate.

5. The liquid crystal display device according to claim 1, wherein the incident plane protrusions are triangular in cross-sectional profile on a surface parallel to a principal plane of the light guide plate.

6. A liquid crystal display device comprising:
   a liquid crystal display panel; and
   a backlight,
   the backlight including a light guide plate and white LEDs arrayed in a first direction and opposed to a plane of incidence of the light guide plate,
   the white LEDs each including on a light-emitting surface:
   a first area occupied by a blue spectrum more densely than at adjacent sides of the first area in the center of the first direction on the light-emitting surface; and
   a second area occupied by a yellow spectrum more densely at adjacent sides of the second area in the first direction on the light-emitting surface than in the first area, wherein
   first incident plane protrusions, extending in a direction that is perpendicular to a thickness direction of the light guide plate, are formed on a section corresponding to the first area of each LED, at the plane of incidence of the light guide plate,
   second incident plane protrusions, extending in the direction that is perpendicular to the thickness direction of the light guide plate, are formed on a section corresponding to the second area of the LED, at the plane of incidence of the light guide plate, and
   the first incident plane protrusions are formed at pitches shorter than those of the second incident plane protrusions.

7. The liquid crystal display device according to claim 6, wherein the height of the first incident plane protrusions is greater than that of the second incident plane protrusions.

8. The liquid crystal display device according to claim 7, wherein the area having the dense blue spectrum has a maximum "u'" value of 0.4 on a CIE chromaticity diagram.

9. The liquid crystal display device according to claim 6, wherein the area having the dense blue spectrum has a maximum "u'" value of 0.4 on a CIE chromaticity diagram.

10. The liquid crystal display device according to claim 6, wherein the incident plane protrusions are arc-shaped in cross-sectional profile on a surface parallel to a principal plane of the light guide plate.

11. The liquid crystal display device according to claim 6 wherein the incident plane protrusions are triangular in cross-sectional profile on a surface parallel to a principal plane of the light guide plate.

12. A liquid crystal display device comprising:
    a liquid crystal display panel; and
    a backlight,
    the backlight including a light guide plate and white LEDs arrayed in a first direction and opposed to a plane of incidence of the light guide plate,
    the white LEDs each including on a light-emitting surface:
    a first area occupied by a blue spectrum more densely than at adjacent sides of the first area in the center of the first direction on the light-emitting surface; and
    a second area occupied by a yellow spectrum more densely at adjacent sides of the second area in the first direction on the light-emitting surface than in the first area, wherein
    first incident plane protrusions, extending in a direction that is perpendicular to a thickness direction of the light guide plate, are formed on a section corresponding to the first area of each LED, at the plane of incidence of the light guide plate,
    second incident plane protrusions, extending in the direction that is perpendicular to the thickness direction—of the light guide plate, are formed on a section corresponding to the second area of the LED, at the plane of incidence of the light guide plate, and
    the height of the first incident plane protrusions is greater than that of the second incident plane protrusions.

13. The liquid crystal display device according to claim 12, wherein a pitch of the first incident plane protrusions is the same as that of the second incident plane protrusions.

14. The liquid crystal display device according to claim 13, wherein the area having the dense blue spectrum has a maximum "u'" value of 0.4 on a CIE chromaticity diagram.

15. The liquid crystal display device according to claim 12, wherein the area having the dense blue spectrum has a maximum "u'" value of 0.4 on a CIE chromaticity diagram.

16. The liquid crystal display device according to claim 12, wherein the incident plane protrusions are arc-shaped in cross-sectional profile on a surface parallel to a principal plane of the light guide plate.

17. The liquid crystal display device according to claim 12, wherein the incident plane protrusions are triangular in cross-sectional profile on a surface parallel to a principal plane of the light guide plate.

* * * * *